(12) United States Patent
Fukino et al.

(10) Patent No.: US 9,766,425 B2
(45) Date of Patent: Sep. 19, 2017

(54) LENS BARREL, IMAGE CAPTURING DEVICE AND METHOD OF MANUFACTURING THE SAME

(71) Applicant: NIKON CORPORATION, Tokyo (JP)

(72) Inventors: Kunihiro Fukino, Fujisawa (JP); Masaaki Kusano, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/466,607

(22) Filed: Aug. 22, 2014

(65) Prior Publication Data

US 2014/0362453 A1  Dec. 11, 2014

Related U.S. Application Data

(63) Continuation of application No. PCT/JP2013/054544, filed on Feb. 22, 2013.

(30) Foreign Application Priority Data

Feb. 28, 2012  (JP) ................... 2012-042479

(51) Int. Cl.
| | | |
|---|---|---|
| *G02B 15/14* | (2006.01) | |
| *G02B 7/10* | (2006.01) | |
| *G03B 17/12* | (2006.01) | |

(52) U.S. Cl.
CPC ............... *G02B 7/10* (2013.01); *G02B 7/102* (2013.01); *G03B 17/12* (2013.01); *Y10T 29/49826* (2015.01)

(58) Field of Classification Search
CPC .......... G02B 7/04; G02B 7/021; G02B 7/023; G02B 7/026

USPC ................... 359/694–706, 811–830
See application file for complete search history.

(56) References Cited

U.S. PATENT DOCUMENTS

| | | |
|---|---|---|
| 4,534,624 A | 8/1985 | Toda et al. |
| 4,980,711 A | 12/1990 | Komatsuzaki et al. |
| 5,581,411 A | 12/1996 | Nomura et al. |
| 5,717,528 A | 2/1998 | Ihara et al. |
| 5,956,187 A | 9/1999 | Shintani |
| 6,035,136 A | 3/2000 | Hayashi et al. |

(Continued)

FOREIGN PATENT DOCUMENTS

| | | |
|---|---|---|
| CN | 1661409 A | 8/2005 |
| CN | 101819311 A | 9/2010 |

(Continued)

OTHER PUBLICATIONS

International Search Report issued in International Patent Application No. PCT/JP2013/054544 dated May 28, 2013 (with translation).

(Continued)

*Primary Examiner* — Mahidere Sahle
(74) *Attorney, Agent, or Firm* — Oliff PLC

(57) ABSTRACT

A lens barrel includes: a first cylindrical member that extends in a prescribed axial direction; a second cylindrical member that slides in the prescribed axial direction along an inner circumferential surface of the first cylindrical member; an axis member that slides in the prescribed axial direction along an inner circumferential surface of the second cylindrical member; and a first holding member that is fixed to the axis member, is guided in the prescribed axial direction by the slide of the axis member against the second cylindrical member, and holds a first optical member.

18 Claims, 11 Drawing Sheets

(56) References Cited

U.S. PATENT DOCUMENTS

| | | |
|---|---|---|
| 6,069,745 A | 5/2000 | Fujii et al. |
| 6,434,331 B1 | 8/2002 | Araoka et al. |
| 6,556,359 B2 | 4/2003 | Emura et al. |
| 6,778,335 B2 | 8/2004 | Takanashi |
| 7,050,244 B2 | 5/2006 | Hayashi et al. |
| 7,403,348 B2 | 7/2008 | Kuroda et al. |
| 7,423,823 B2 | 9/2008 | Naganuma et al. |
| 2010/0172032 A1 | 7/2010 | Fukino |
| 2010/0220403 A1 | 9/2010 | Fukino |
| 2012/0281298 A1 | 11/2012 | Fukino |

FOREIGN PATENT DOCUMENTS

| | | |
|---|---|---|
| JP | A-2-210314 | 8/1990 |
| JP | U-5-45617 | 6/1993 |
| JP | A-7-191253 | 7/1995 |
| JP | A-10-148746 | 6/1998 |
| JP | A-11-194258 | 7/1999 |
| JP | H11-218666 A | 8/1999 |
| JP | A-2000-89086 | 3/2000 |
| JP | A-2003-140019 | 5/2003 |
| JP | A-2005-208579 | 8/2005 |
| JP | 2005-241842 A | 9/2005 |
| JP | A-2006-215340 | 8/2006 |
| JP | A-2007-25125 | 2/2007 |
| JP | A-2010-197885 | 9/2010 |
| JP | A-2010-197898 | 9/2010 |

OTHER PUBLICATIONS

Mar. 10, 2016 Office Action issued in Chinese Application No. 201380010668.8.

Jan. 5, 2016 Office Action issued in Japanese Application No. 2012-042479.

Dec. 27, 2016 Office Action issued in Chinese Application No. 201380010668.8.

LENS BARREL, IMAGE CAPTURING DEVICE AND METHOD OF MANUFACTURING THE SAME

CROSS-REFERENCE TO RELATED APPLICATION

This application is a continuation application of PCT/JP2013/054544 filed on Feb. 22, 2013, which claims priority to Japanese Patent Application No. 2012-042479 filed on Feb. 28, 2012, the contents of which are herein wholly incorporated by reference.

FIELD

A certain aspect of the embodiments discussed herein is related to a lens barrel, an image capturing device and a method of manufacturing the same.

BACKGROUND

Conventionally, an lens barrel to be attached to a camera includes: a fixed cylinder that is fixed to the camera in a state where it is attached to the camera; a cam cylinder that rotates about the fixed cylinder; and a plurality of lens groups that move in an optical axis direction by the rotation of the cam cylinder (e.g. see Japanese Laid-open Patent Publication No. 2000-89086).

On a design, such a lens barrel has various restrictions in order to secure optical performance. It is desirable to simplify the structure in the lens barrel, in order to secure the optical performance under the restrictions.

SUMMARY

According to an aspect of the present invention, there is provided a lens barrel of the present invention includes: a first cylindrical member that extends in a prescribed axial direction; a second cylindrical member that slides in the prescribed axial direction along an inner circumferential surface of the first cylindrical member; an axis member that slides in the prescribed axial direction along an inner circumferential surface of the second cylindrical member; and a first holding member that is fixed to the axis member, is guided in the prescribed axial direction by the slide of the axis member against the second cylindrical member, and holds a first optical member.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a detailed description will be given of a camera and a lens barrel with which the camera is provided, according to an embodiment, based on FIGS. 1 to 7.

Figure 1:
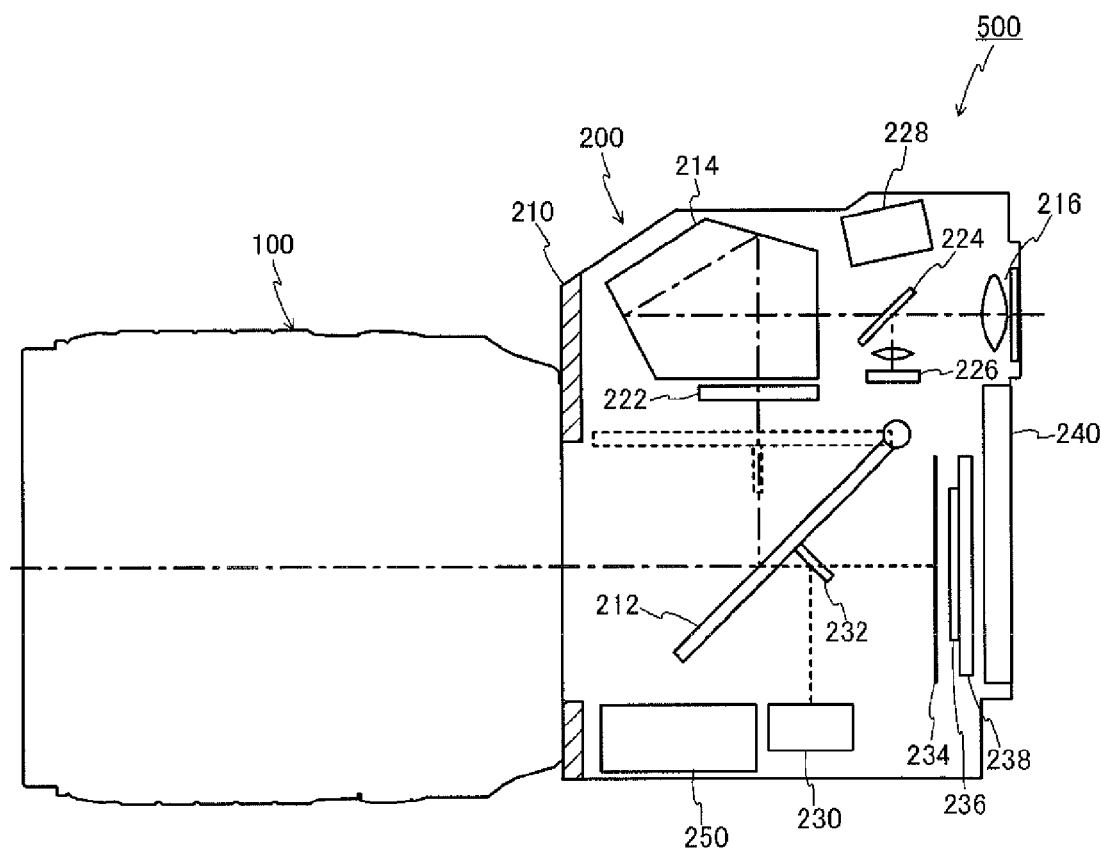
FIG. 1 is a diagram illustrating the configuration of a camera according to an embodiment.

In FIG. 1, a camera 500 according to the present embodiment is schematically illustrated. As illustrated in FIG. 1, the camera 500 includes an image capturing unit 200 and a lens barrel 100.

The image capturing unit 200 includes: a chassis 210; an optical system including a main mirror 212, a pentaprism 214 and an eyepiece optical system 216; a focus detector 230; a shutter 234; an image capturing element 238; a main LCD 240; and a main controller 250 which are housed in the chassis 210.

In the state of FIG. 1, the main mirror 212 leads most of an incident light made incident from the lens barrel 100 to a focusing screen 222 arranged on the upper side. The focusing screen 222 is arranged at a focusing position of the optical system in the lens barrel 100, and provides an image formed by the optical system in the lens barrel 100.

The pentaprism 214 reflects an image formed on the focusing screen 222, and then leads the reflected image to the eyepiece optical system 216 via a half mirror 224. Thereby, in the eyepiece optical system 216, the operator can observe the image on the focusing screen 222 as an erect image. In this case, the half mirror 224 superimposes a display image indicating a photographing condition, a setting condition and so on formed on a finder LCD 226, onto the image of the focusing screen 222. Therefore, in an exit end of the eyepiece optical system 216, the operator can observe a state where the image of the finder LCD 226 is superimposed on the image of the focusing screen 222. Here, a part of an emitted light of the pentaprism 214 is led to a photometry unit 228, and the intensity of the incident light, its distribution, and so on are measured by the photometry unit 228.

The focus detector 230 detects a focus adjustment state (i.e., focus state) of the optical system in the lens barrel 100 by using a light which penetrates the main mirror 212 and is reflected with a sub-mirror 232 provided on the back side of the main mirror 212. Here, in the case of photographing, the main mirror 212 and the sub-mirror 232 go up to a position illustrated in FIG. 1 with a dashed line so that they evacuate from an optical path of the incident light which enters from the lens barrel 100.

The shutter 234 is arranged behind the main mirror 212 (i.e., a rear side of the optical path of the incident light which enters from the lens barrel 100). In the case of photographing, the shutter 234 performs open operation in conjunction with the rising operation of the main mirror 212 and the sub-mirror 232. In a state where the shutter 234 is opened, the incident light from the lens barrel 100 enters into the image capturing element 238 via an optical filter 236. The image capturing element 238 converts the image formed by the incident light, into an electrical signal.

A display screen portion of the main LCD 240 is in a state exposed to the exterior of the chassis 210. Various setting information in the image capturing unit 200 in addition to the image (i.e., a photographed image) formed on the image capturing element 238 are displayed on the display screen of this main LCD 240.

The main controller 250 generally controls various operation of each element mentioned above. Moreover, the main controller 250 drives the optical system (e.g. lenses L1 to L6) in the lens barrel 100 (i.e., autofocus) with reference to the information on the focus adjustment state of the optical system which the focus detector 230 in the image capturing unit 200 detects, and displays the execution of the focusing on the finder LCD 226 (i.e., focus aid) with reference to an operation amount of the optical system in the lens barrel 100.

Next, a detailed description will be given of the configuration of the lens barrel 100 based on FIGS. 2 to 7.

Figure 2:
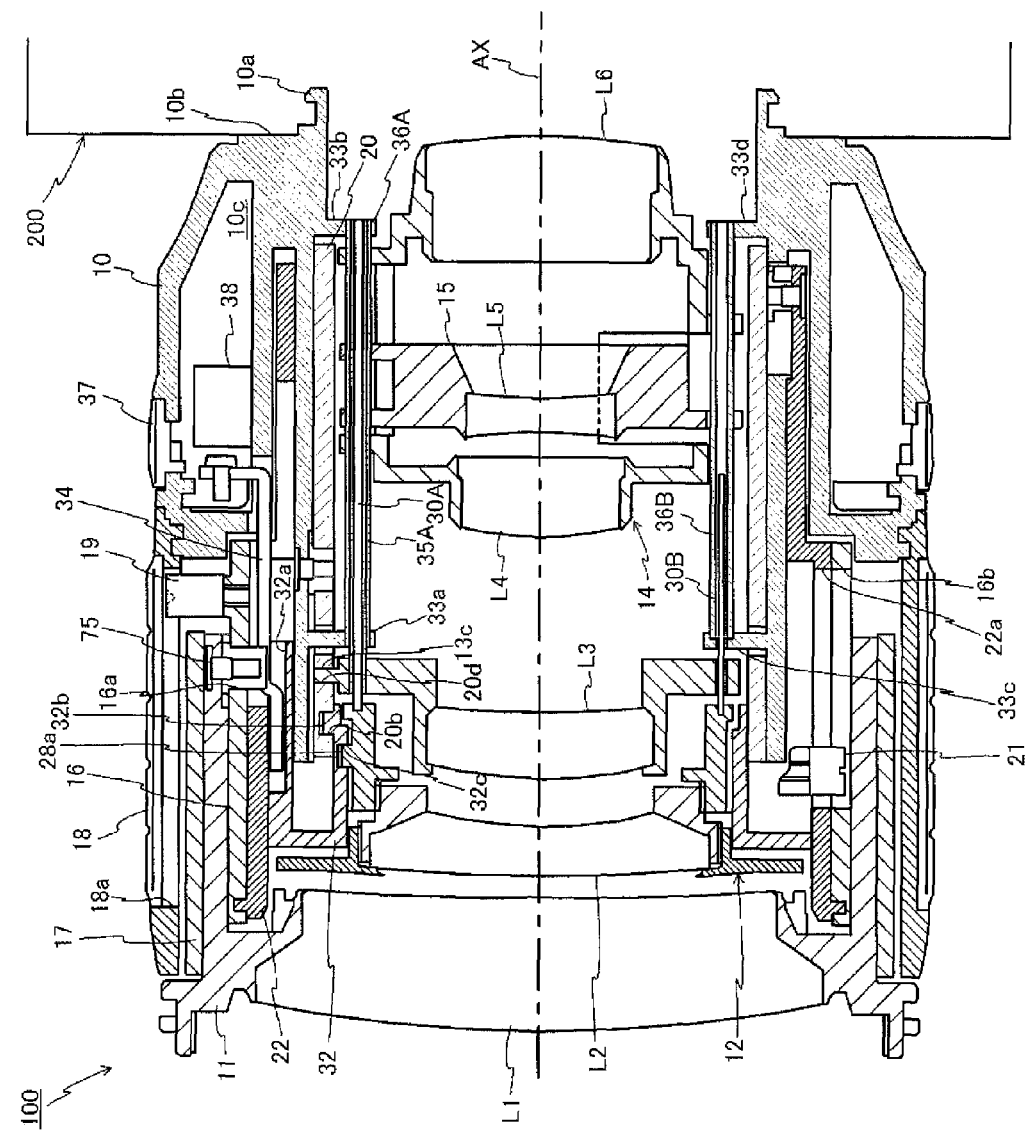
FIG. 2 is a cross-section diagram illustrating a lens barrel (a state where the lens barrel is placed at a wide angle end)
Figure 3:
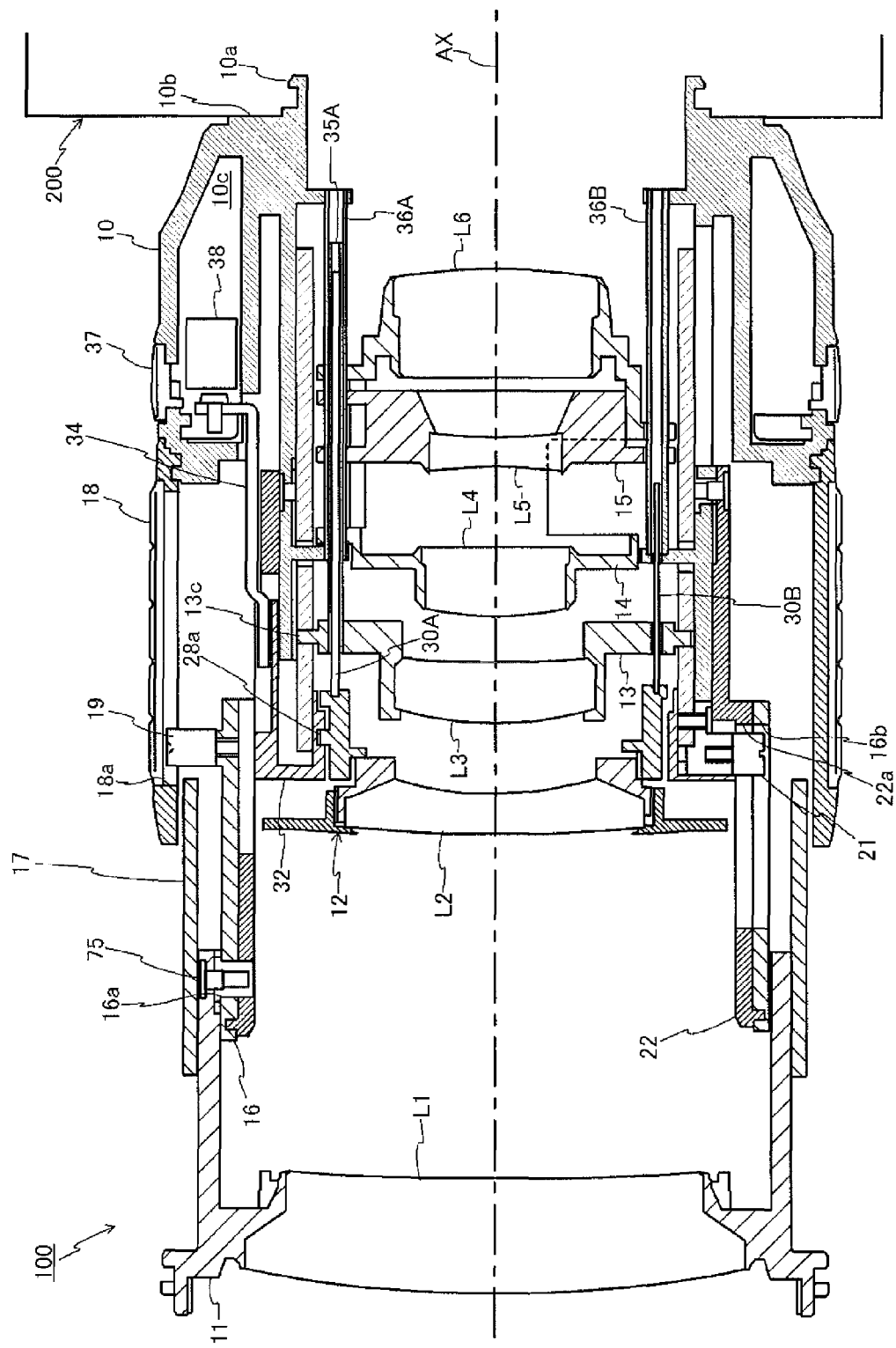
FIG. 3 is a cross-section diagram illustrating the lens barrel (a state where the lens barrel is placed at a telephoto end)

Cross-section diagrams of the lens barrel 100 are illustrated in FIGS. 2 and 3. In these drawings, FIG. 2 illustrates a state where the lens barrel 100 is placed at a wide angle end, and FIG. 3 illustrates a state where the lens barrel 100 is zoomed to a telephoto end. As illustrated in FIGS. 2 and 3, the lens barrel 100 includes a first group lens L1, a second group lens L2, a third group lens L3, a fourth group lens L4, a fifth group lens L5 and a sixth group lens L6 which are arranged on a common optical axis AX. In the following description, it is assumed that a side of the first group lens L1 (i.e., an objection side) in an optical axis AX direction is a front side, and a side of the sixth group lens L6 (i.e., an image side) in the optical axis AX direction is a rear side.

As illustrated in FIGS. 2 and 3, the lens barrel 100 includes: a fixed cylinder 10; a first group lens sliding cylinder 11 that holds the first group lens L1; a second group lens sliding cylinder 12 that holds the second group lens L2; a third group lens sliding cylinder 13 that holds the third group lens L3; a fourth and sixth group lens sliding cylinder 14 that holds the fourth group lens L4 and the sixth group lens L6; and a fifth group lens sliding cylinder 15 that holds the fifth group lens L5.

The fixed cylinder 10 is fixed to the image capturing unit 200 at a base unit 10a. In the fixed state, an end face 10b of the fixed cylinder 10 on the side of the image capturing unit 200 comes in close contact with the image capturing unit 200 (i.e., the chassis 210 of FIG. 1), so that the fixed cylinder 10, i.e., the lens barrel 100 is positioned to the image capturing unit 200. In the fixed cylinder 10, a pair of projecting portions 33a and 33b provided near an upper portion (i.e., a ceiling portion) inside the fixed cylinder 10 support a guide pipe 36A, and a pair of projecting portions 33c and 33d provided near a lower portion inside the fixed cylinder 10 support a guide pipe 36B. The guide pipes 36A and 36B are arranged at the positions (i.e., positions in which the distances from the optical axis are approximately the same as each other, and the positions which are opposed to each other and sandwich the optical axis) which are opposed to each other at 180 degrees on the basis of the optical axis AX of the lens barrel 100. A guide pipe 35A is inserted in the inside of the guide pipe 36A (i.e., the guide pipes have double structure). The outside diameter of the guide pipe 35A is set to have almost the same as the inside diameter of the guide pipe 36A. Here, the term "almost the same diameters" means sizes in which a gap of the degree that the slide of the guide pipe 35A does not have a trouble is formed between the guide pipe 36A and the guide pipe 35A. Thereby, the guide pipe 35A can perform sliding movement along the inner circumferential surface of the guide pipe 36A. Here, stainless steel with high intensity and lightweight can be adopted as a material of the guide pipes 36A and 36B and the guide pipe 35A.

The first group lens sliding cylinder 11 is interlockably coupled with a zoom driving cylinder 16 provided inside the first group lens sliding cylinder 11. Specifically, a cam pin 75 implanted in the first group lens sliding cylinder 11 is in a state of engaging with a cam groove 16a formed on the zoom driving cylinder 16.

On the contrary, in the outermost circumference of the lens barrel 100, the zoom driving cylinder 16 is interlockably coupled with a zoom operation ring 18 which can rotate about the optical axis AX. Specifically, a driving force transfer pin 19 projected outward from the zoom driving cylinder 16 engages with an operation groove 18a which is formed on the inner circumference of the zoom operation ring 18 and is in parallel with the optical axis AX. Thereby, the zoom driving cylinder 16 rotates in conjunction with the rotation of the zoom operation ring 18. The zoom operation ring 18 cannot move in a front-back direction, and an antiskid rubber layer is provided on an outer circumferential surface of the zoom operation ring 18. The zoom operation ring 18 is rotated by a user in the case of variable power operation (zooming).

The zoom driving cylinder 16 can rotate against a zoom guidance cylinder 22 provided in the inside of the zoom driving cylinder 16. As illustrated in the lower half of FIGS. 2 and 3, a cam groove 22a is pierced and formed on the zoom guidance cylinder 22. A rotation coupling member 21 fixed to the cam ring 20 provided in the inside of the fixed cylinder 10 engages with the zoom guidance cylinder 22 and a straight groove 16b which is pierced and formed on the zoom driving cylinder 16.

According to the above-mentioned structure, when the zoom operation ring 18 is rotated, the zoom driving cylinder 16 rotates by the action of the driving force transfer pin 19, and the first group lens sliding cylinder 11 moves in the front-back direction (i.e., the direction along the optical axis AX) by the rotation of the zoom driving cylinder 16 and the action of the cam pin 75. When the zoom driving cylinder 16 rotates by the rotation of the zoom operation ring 18, the torque is transmitted to the cam ring 20 via the rotation coupling member 21, and hence the cam ring 20 moves in the front-back direction while rotating. Here, the zoom guidance cylinder 22 moves in the front-back direction without rotating.

Here, a cover cylinder 17 is provided between the zoom operation ring 18 and the first group lens sliding cylinder 11. As illustrated in FIGS. 2 and 3, the cover cylinder 17 moves in the front-back direction along with the first group lens sliding cylinder 11, seals between the zoom operation ring 18 and the first group lens sliding cylinder 11, and prevents the invasion of dust into the lens barrel 100.

Figure 4:
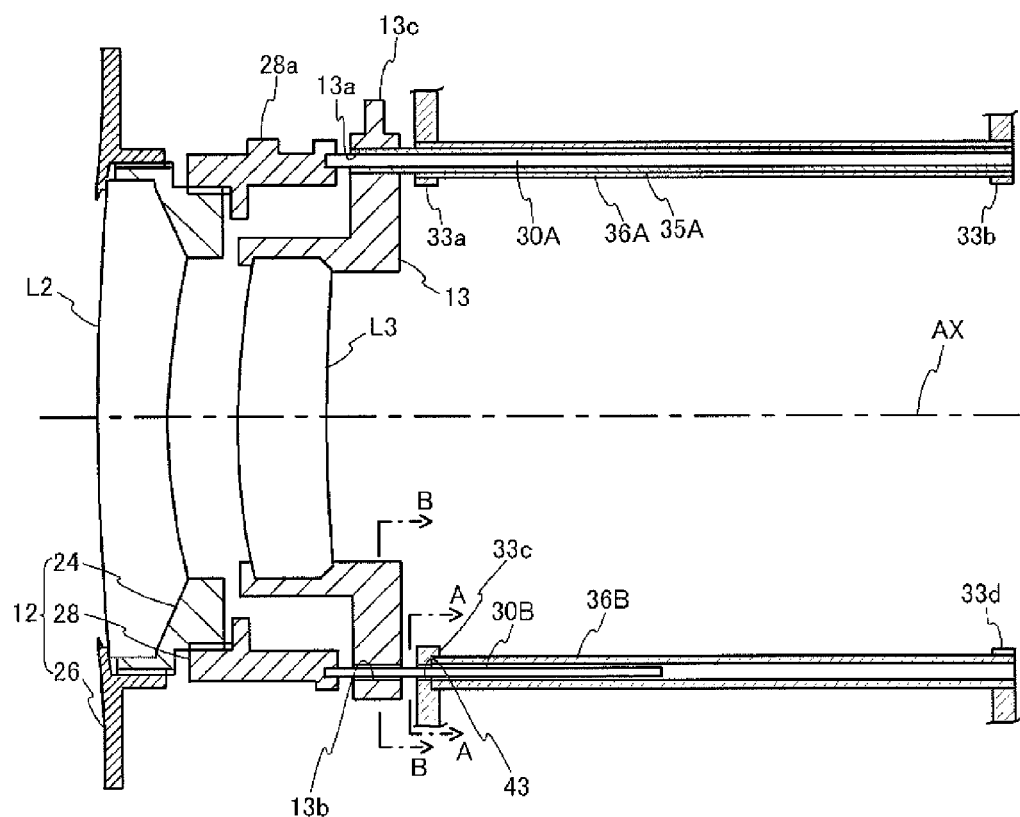
FIG. 4 is a diagram abstracting and illustrating a second group lens sliding cylinder, a third group lens sliding cylinder and the vicinity of them.

FIG. 4 is a diagram abstracting and illustrating the second group lens sliding cylinder 12, the third group lens sliding cylinder 13 and the vicinity of them. As illustrated in FIG. 4, the second group lens sliding cylinder 12 includes: a holding cylinder 24 that holds the second group lens L2; a holding ring 26 that is fixed to the holding cylinder 24; and an engaging cylinder 28 that is provided in the state of surrounding the outer circumference of the holding cylinder 24. The holding cylinder 24 and the holding ring 26 are fixed by a screw fastening, and hold an outer edge portion of the second group lens L2.

The engaging cylinder 28 performs cantilever support of two guide bars 30A and 30B. The two guide bars 30A and 30B sandwich the optical axis AX and are arranged at vertically symmetrical positions (i.e., positions which is opposed to each other at 180 degrees).

The guide bar 30A is a cylindrical member slidably inserted into the guide pipe 35A that is inserted into the guide pipe 36A, as illustrated in FIG. 4. The outside diameter of the guide bar 30A is set to have almost the same as the inside diameter of the guide pipe 35A. Here, the term "almost the same diameters" means sizes in which a gap of the degree that the slide of the guide bar 30A does not have a trouble is formed between the guide pipe 35A and the guide bar 30A. Here, it is not necessary to carry out surface contact between the guide bar 30A and the guide pipe 35A, and point contact between the guide bar 30A and the guide pipe 35A may only be carried out at two points near one end and another end of the guide pipe 36A.

Figure 5A:
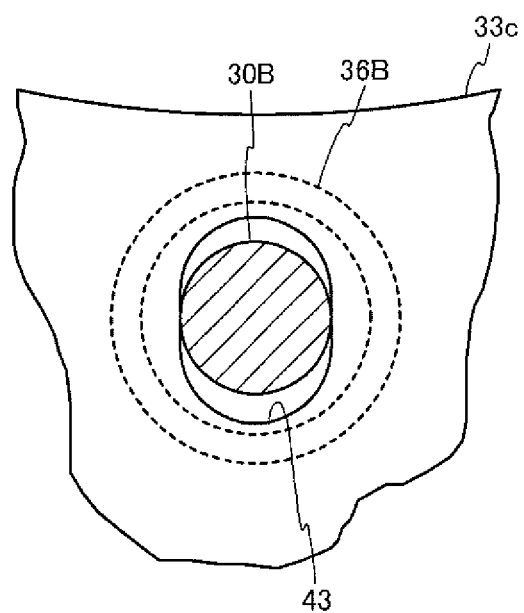
FIG. 5A is a cross-section diagram taken along a line A-A in FIG. 4.

The guide bar 30B is a cylindrical member which is in the state inserted in the guide pipe 36B via an elliptic hole 43 which is pierced and formed on the projecting portion 33c, as illustrated in FIG. 4. A cross-section diagram taken along a line A-A in FIG. 4 is illustrated in FIG. 5A. As illustrated in FIG. 5A, the diameter of the section of the guide bar 30B is set to have almost the same as the width of the elliptic hole 43 (the width of the horizontal direction of the paper surface in FIG. 5A), i.e., to a size of the degree that the slide of the guide bar 30B does not have a trouble. The movement of the second group lens sliding cylinder 12 in a rotational direction around the guide bar 30A is controlled by the contact of the guide bar 30B and the inner circumferential surface of the elliptic hole 43. Here, as illustrated in FIG. 5A, the inside diameter of the guide pipe 36B is set larger than the guide bar 30B, and a gap is secured between the guide pipe 36B and the guide bar 30B (the guide bar 30B and the guide pipe 36B are non-contact).

Here, a material with high intensity and lightweight, such as stainless steel, can be adopted as a material of the guide bars 30A and 30B, as with the guide pipes 36A, 36B and 35A. The guide bars 30A and 30B are fixed to the engaging cylinder 28 through processing of adhesion or press-fitting.

A projection-shaped follower 28a is formed on a part of the outer circumferential surface of the engaging cylinder 28, as illustrated in FIG. 4. The follower 28a engages with a circumferential groove 32c of an interlocking ring 32 provided outside the engaging cylinder 28, as illustrated in FIG. 2. Here, the follower 28a is arranged near the guide bar 30A, i.e., near an extension axis which extends a central axis of the guide bar 30A.

Moreover, an interlocking groove 32a and a cam follower 32b are formed on the interlocking ring 32 on which the circumferential groove 32c is formed. One end portion of an interlocking key 34 having a substantial L-shape engages with the interlocking groove 32a. The interlocking key 34 is connected to a focus ring 37 provided on an outer circumferential unit of the fixed cylinder 10, and moves in a rotational direction around the optical axis AX in accordance with the rotation of the focus ring 37 around the optical axis AX. Thus, the interlocking key 34 moves in the rotational direction around the optical axis AX, so that the interlocking ring 32 rotates about the optical axis AX. The interlocking key 34 is connected also to a motor 38 provided in a motor room 10c of the fixed cylinder 10. Therefore, the interlocking ring 32 rotates about the optical axis AX by also the movement of the interlocking key 34 in the rotational direction around the optical axis AX along with the rotational operation of the motor 38.

The cam follower 32b engages with a cam groove 20b formed on the cam ring 20. Therefore, when the interlocking ring 32 rotates, the interlocking ring 32 and members (i.e., the second group lens sliding cylinder 12, the guide bars 30A and 30B, and the second group lens L2) coupled with the interlocking ring 32 move in the front-back direction by the action of the cam groove 20b and the cam follower 32b. In the movement of the front-back direction, the interlocking ring 32 moves in the front-back direction while rotating about the optical axis AX. Since the moving direction of the guide bar 30A is only the front-back direction by the guide pipes 35A and 36A, the second group lens sliding cylinder 12 and the second group lens L2 which are connected to the guide bar 30A move in the front-back direction without rotating about the optical axis. Here, the cam follower 32b is arranged near the guide bar 30A, i.e., near the extension axis which extends the central axis of the guide bar 30A.

The third group lens sliding cylinder 13 includes a circular hole 13a and an elliptic hole 13b, as illustrated in FIG. 4.

The inner diameter of the circular hole 13a is the same as the outer diameter of the guide pipe 35A. The third group lens sliding cylinder 13 holds the guide pipe 35A in a state where the guide pipe 35A is inserted in the circular hole 13a. In this case, the guide pipe 35A is fixed to the third group lens sliding cylinder 13 through processing of adhesion or press-fitting.

Figure 5B:
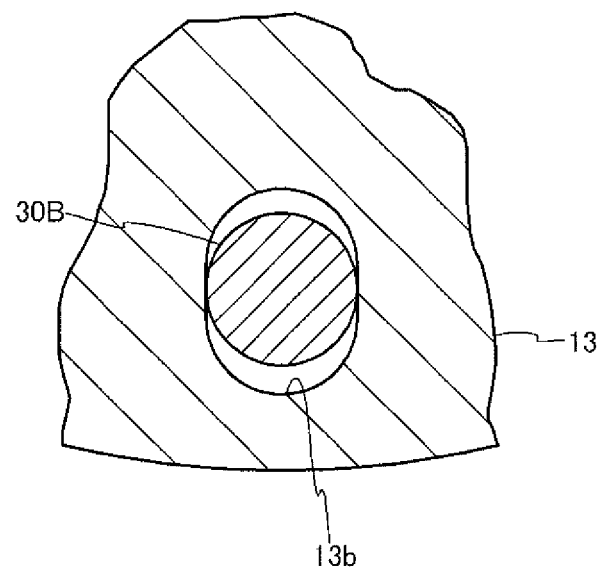
FIG. 5B is a cross-section diagram taken along a line B-B in FIG. 4.

The elliptic hole 13b has an elliptic shape, as illustrated in FIG. 5B which is a cross-section diagram taken along a line B-B in FIG. 4. The width of the elliptic hole 13b (the width of the horizontal direction of the paper surface in FIG. 5B) is set to have almost the same as the diameter of the guide bar 30B, i.e., to a size of the degree that the slide of the third group lens sliding cylinder 13 does not have a trouble. The movement in the rotational direction around the guide pipe 35A of the third group lens sliding cylinder 13 is controlled by the contact of the guide bar 30B and the inner circumferential surface of the elliptic hole 13b. Here, a cross-sectional U-shaped groove having the same function as the ellipse hole 13b may be formed on the third group lens sliding cylinder 13, instead of the ellipse hole 13b.

Moreover, a cam follower 13c is provided near the circular hole 13a of the third group lens sliding cylinder 13, as illustrated in FIG. 2. The cam follower 13c engages with a cam groove 20d formed on the cam ring 20. Therefore, when the cam ring 20 rotates, the third group lens sliding cylinder 13 moves in the front-back direction by the action of the cam groove 20d and the cam follower 13c. Since the moving direction of the guide pipe 35A is only the front-back direction by the guide pipes 36A in the movement of the front-back direction, the third group lens sliding cylinder 13 and the third group lens L3 which are connected to the guide pipe 35A move in the front-back direction without rotating.

Figure 6:
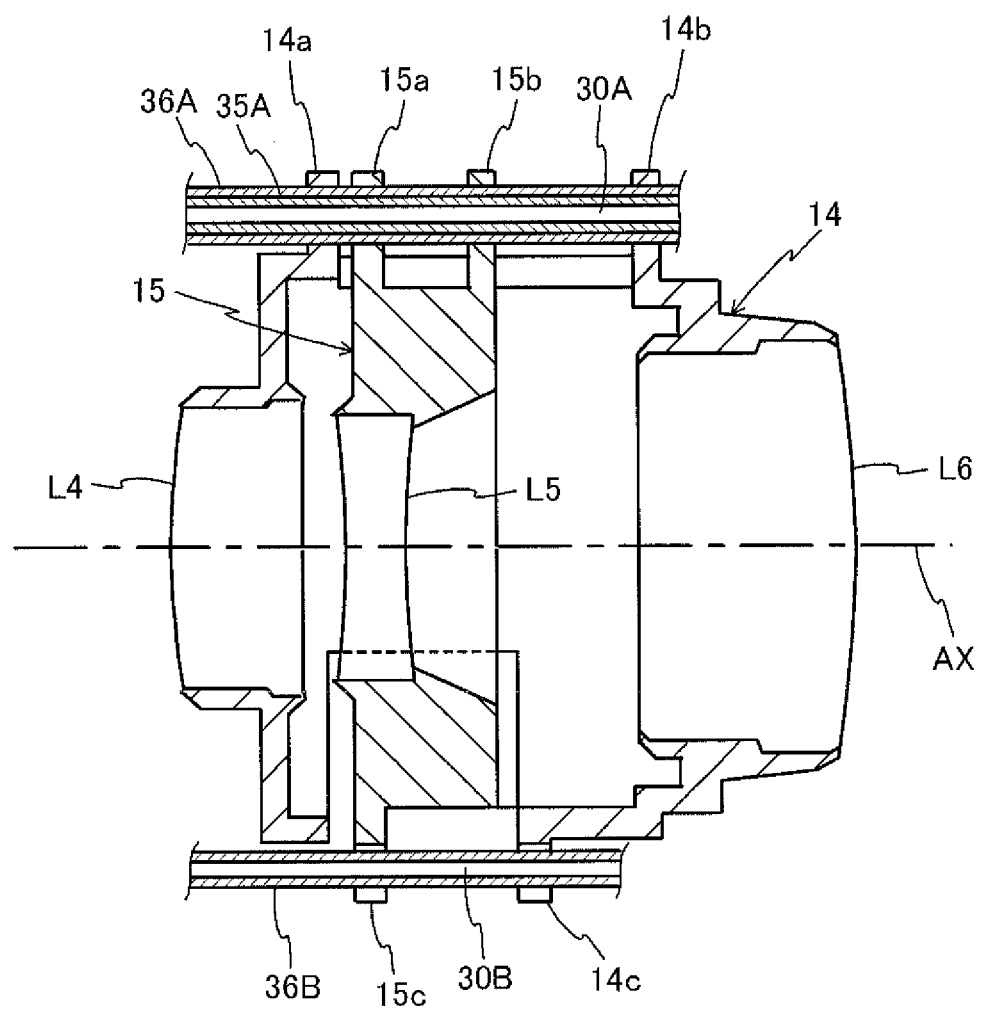
FIG. 6 is a diagram abstracting and illustrating a fourth and sixth group lens sliding cylinder, a fifth group lens sliding cylinder and the vicinity of them.

FIG. 6 is a diagram abstracting and illustrating the fourth and sixth group lens sliding cylinder 14, the fifth group lens sliding cylinder 15 and the vicinity of them. As illustrated in FIG. 6, the fourth and sixth group lens sliding cylinder 14 holds the fourth group lens L4 and the sixth group lens L6 in a state where the lenses L4 and L6 are separated in a direction of the optical axis AX by a predetermined interval. The fifth group lens sliding cylinder 15 holds the fifth group lens L5 between the fourth group lens L4 and the sixth group lens L6.

The fourth and sixth group lens sliding cylinder 14 includes engaging units 14a and 14b that engages with the guide pipe 36A, and an engaging unit 14c that engages with the guide pipe 36B. Moreover, the fifth group lens sliding cylinder 15 includes engaging units 15a and 15b that engages with the guide pipe 36A, and an engaging unit 15c that engages with the guide pipe 36B.

Each of engaging units 14a, 14b, 15a and 15b has a circular through-hole. The through-hole has almost the same diameter as the guide pipe 36A. The fourth and sixth group lens sliding cylinder 14 and the fifth group lens sliding cylinder 15 are guided in the front-back direction by the guide pipe 36A in a state where the guide pipe 36A is inserted into the through-holes. Here, the term "almost the same diameter" means sizes in which a gap of the degree that the slide of the fourth and sixth group lens sliding cylinder 14 and the fifth group lens sliding cylinder 15 does not have a trouble is formed between guide pipe 36A and each of the through-holes. The guide pipe 36A supports all the weight or at least a half of all the weight (i.e., the weight changes by a posture of the lens barrel 100) of the fourth and sixth group lens sliding cylinder 14 and the fifth group lens sliding cylinder 15. On the other hand, each of engaging units 14c and 15c has a U-shaped groove. The width of the U-shaped groove is set to have almost the same as the diameter of the guide pipe 36B, i.e., to a size of the degree that the slide of the fourth and sixth group lens sliding cylinder 14 and the fifth group lens sliding cylinder 15 does not have a trouble. The movement in the rotational direction around the guide pipe 36A of the fourth and sixth group lens sliding cylinder 14 and the fifth group lens sliding cylinder 15 is controlled by the contact of the guide pipe 36B and the engaging units 14c and 15c. Here, an ellipse hole which is long in a radial direction and has the same function as the U-shaped groove may be formed on each of the engaging units 14c and 15c, instead of the U-shaped groove.

Here, the fourth and sixth group lens sliding cylinder 14 and the fifth group lens sliding cylinder 15 are driven in the front-back direction (i.e., the direction of the optical axis AX) in conjunction with the rotational movement around the optical axis AX of the cam ring 20.

Next, a description will be given of the moving operation of each of the lens L1 to L6 when the zoom operation (zooming) is performed and the moving operation of each of the lens L1 to L6 when the focus adjustment (focusing) is performed, based on FIGS. 2 and 3.

First, a description will be given of the moving operation of each lens in the case of zooming. Here, a description will be given of operation of the lens barrel 100 zoomed from the wide angle end (FIG. 2) to the telephoto end (FIG. 3).

When the zoom operation ring 18 is rotated by a user from the state of FIG. 2, the zoom driving cylinder 16 rotates and the first group lens sliding cylinder 11 and the first group lens L1 go straight forward via the cam groove 16a and the cam pin 75. Moreover, when the zoom operation ring 18 is rotated, the cam ring 20 is rotated via the rotation coupling member 21 as described above. With this rotation, the torque and the moving force in the front direction act on also the interlocking ring 32 via the cam follower 32b. However, since the interlocking ring 32 is guided only in the front-back direction by the interlocking key 34 (fixed state) which engages with the interlocking groove 32a, the interlocking ring 32 goes straight forward without rotating. With going straight of this interlocking ring 32, the second group lens L2 and the engaging cylinder 28 (i.e., the second group lens sliding cylinder 12) which engages with the interlocking ring 32 move forward. Moreover, the third group lens L3 and the third group lens sliding cylinder 13 which engages with the cam ring 20 move forward.

In addition, the rotation of the cam ring 20 also moves the fourth and sixth group lens sliding cylinder 14 and the fifth group lens sliding cylinder 15 (the fourth group lens L4 to the sixth group lens L6) forward.

Thus, in the case of zooming, each of the first group lens L1 to the sixth group lens L6 moves forward by a discrete distance with the rotational operation of the zoom operation ring 18 (here, the lenses L4 and L6 move by the same distance).

Figure 7:
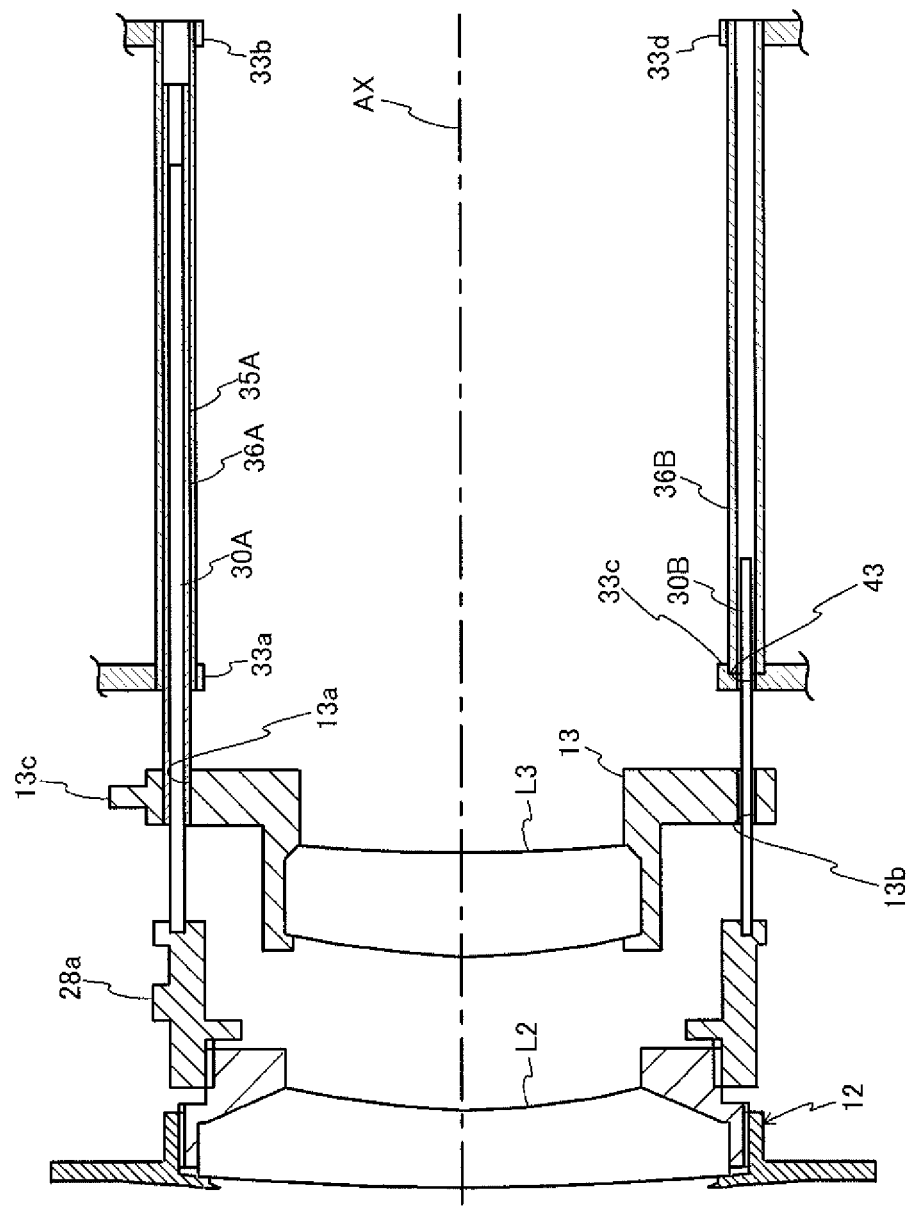
FIG. 7 is a diagram illustrating a state where the second group lens sliding cylinder and the third group lens sliding cylinder move forward from a state of FIG. 4.

FIG. 7 illustrates a state where the second group lens sliding cylinder 12 and the third group lens sliding cylinder 13 move forward from the state of FIG. 4. Even if the second group lens sliding cylinder 12 and the third group lens sliding cylinder 13 move forward, the guide bar 30B keeps maintaining a state of contacting with the projecting portion 33c (the elliptic hole 43) and the third group lens sliding cylinder 13 (the ellipse hole 13b), as illustrated in FIG. 7. The guide bar 30A keeps maintaining an insertion state to the guide pipe 35A, and the guide pipe 35A keeps maintaining an insertion state to the guide pipe 36A.

Next, a description will be given of the moving operation of each lens in the case of focusing.

First, the focus ring 37 is rotated by the user or the motor 38 is rotationally driven, so that the interlocking key 34 moves in the rotational direction around the optical axis AX, and the interlocking ring 32 which engages with the interlocking key 34 rotates about the optical axis AX, as described above. By this rotation, the interlocking ring 32 arranges the cam follower 32b along the cam groove 20b of the cam ring 20, and also moves forward. By the movement of this interlocking ring 32 in the rotational direction and the front direction, the second group lens L2 and the engaging cylinder 28 (i.e., the second group lens sliding cylinder 12) having the follower 28a which engages with the circumferential groove 32c of the interlocking ring 32 move forward. Here, since the cam follower 32b and the follower 28a are arranged near the guide bar 30A, the cam follower 32b and the follower 28a can make a driving force in the optical axis AX direction efficiently act on the interlocking ring 32 and the engaging cylinder 28.

On the other hand, since the cam ring 20 is in a fixed state of no rotation, the first group lens L1 and the third group lens L3 to the sixth group lens L6 do not move in the front-back direction.

Thus, in the case of focusing, only the second group lens L2 moves in the front (back) direction with the rotational direction of the interlocking key 34.

Here, the main controller 250 of FIG. 1 controls the rotation of the motor 38 in the case of focusing based on a detection result of the focus detector 230. That is, the autofocus is performed according to the rotational control of the motor 38 by the main controller 250. Here, the lens barrel 100 and the image capturing unit 200 are electrically connected by a connection terminal provided therebetween. Thereby, an electric power is supplied to the lens barrel 100 (e.g. the motor 38) from a side of the image capturing unit 200.

As described above in detail, according to the present embodiment, the guide pipe 35A slides in the direction of the optical axis AX along the inner circumferential surface of the guide pipe 36A fixed to the fixed cylinder 10, and the guide bar 30A slides in the direction of the optical axis AX along the inner circumferential surface of the guide pipe 35A. Further, the second group lens sliding cylinder 12 which holds the second group lens L2 is fixed to the guide bar 30A and is guided in the optical axis direction by the slide of the guide bar 30A. The third group lens sliding cylinder 13 which holds the third group lens L3 is fixed to the guide pipe 35A and is guided in the optical axis direction by the slide of the guide bar 30A. Thus, in the present embodiment, the second group lens sliding cylinder 12 and the third group lens sliding cylinder 13 can be separately guided with the guide pipes 35A and 36A having the double structure, and the guide bar 30A, and hence it is possible to simplify the structure in the lens barrel 100. Thereby, the space efficiency in the lens barrel 100 can be improved, and the lens barrel 100 can be downsized (the increment of the diameter can be controlled). Moreover, the whole camera 500 can also be downsized by downsizing the lens barrel 100.

Moreover, in the present embodiment, the guide bar 30B extending in the direction of the optical axis AX is fixed to the second group lens sliding cylinder 12 and contacts with the third group lens sliding cylinder 13 and the fixed cylinder 10, so that the moving operation (i.e., the rotational operation) of the second group lens sliding cylinder 12 and the third group lens sliding cylinder 13 around the optical axis AX against the fixed cylinder 10 is controlled. Thereby, since the rotational operation of the two lens sliding cylinders 12 and 13 can be controlled with the one guide bar 30B, also from this point, the structure in the lens barrel 100 can be simplified and the space efficiency in the lens barrel 100 can be improved.

Moreover, in the present embodiment, the fixed cylinder 10 holds the guide pipe 36B extending in the direction of the optical axis AX. The fourth and sixth group lens sliding cylinder 14 and the fifth group lens sliding cylinder 15 are guided in the optical axis direction by the guide pipe 36A, and contact with the guide pipe 36B, so that the moving operation (i.e., the rotational operation) around the optical axis is controlled. Thereby, the fourth and sixth group lens sliding cylinder 14 and the fifth group lens sliding cylinder 15 are guided in the front-back direction in a state of not contacting with the guide bars 30A and 30B and the guide pipe 35A. Therefore, the fourth and sixth group lens sliding cylinder 14 and the fifth group lens sliding cylinder 15 do not disturb the movement of the second group lens sliding cylinder 12 and the third group lens sliding cylinder 13. Thereby, a force required to move the second group lens sliding cylinder 12 and the third group lens sliding cylinder 13 can be reduced, and hence the load of the motor 38 or the load of the user rotating the focus ring 37 can be reduced.

Moreover, in the present embodiment, since the guide bar 30B is inserted inside the guide pipe 36B, the mechanical interference of the guide pipe 36B and the guide bar 30B can be avoided. As compared with the case where the guide pipe 36B and the guide bar 30B are provided separately, the structure in the lens barrel 100 can be simplified and the space efficiency in the lens barrel 100 can be improved.

Moreover, in the present embodiment, the guide pipes 35A and 36A having the double structure support all the weight or at least a half of all the weight (i.e., the weight changes by a posture of the lens barrel 100) of the fourth and sixth group lens sliding cylinder 14 and the fifth group lens sliding cylinder 15. Thus, at least a half of all the weight of the fourth and sixth group lens sliding cylinder 14 and the fifth group lens sliding cylinder 15 is supported by the guide pipes 35A and 36A in which the rigidity is high and the modification is controlled, and hence an optical axis deviation of the fourth group lens L4 to the sixth group lens L6 can be controlled.

Moreover, in the present embodiment, since the guide bar 30A and the guide pipes 35A and 35B have the almost same length, it is possible to lengthen a distance in which the guide pipe 35A guides the guide bar 30A and a distance in which the guide pipe 36A guides the guide pipe 35A. Thereby, the movement length of the second group lens sliding cylinder 12 and the third group lens sliding cylinder 13 can be lengthened. Moreover, in the present embodiment, since the double structure by the guide pipes 35A and 36A is adopted, a movement amount of the second group lens sliding cylinder 12 is a distance in which a movement amount of the third group lens sliding cylinder 13 is added to the length of guide bar 30A. Thereby, it is possible to lengthen the movement amount of the second group lens sliding cylinder 12.

Moreover, in the present embodiment, since the guide pipes 36A and 36B are arranged at the positions which are opposed to each other at 180 degrees on the basis of the optical axis AX of the lens barrel 100, the distance between the guide bars 30A and 30B can be enlarged as much as possible. Thereby, a force required when the rotation around the optical axis AX of the second group lens sliding cylinder 12 and the third group lens sliding cylinder 13 is controlled by the guide bar 30B can be made small, and hence the modification, a force applied to the guide bar 30B, or the like can be made small.

Moreover, in the present embodiment, since the guide bar 30B can be made shorter than the guide bar 30A, the weight of the lens barrel 100 can be reduced, compared with the case where the guide bar 30B is the same length as the guide bar 30A.

Moreover, in the above-mentioned embodiment, the description is given of the case where the guide bar 30B fixed to the second group lens sliding cylinder 12 contacts with the elliptic hole 43 formed on the projecting portion 33c of the fixed cylinder 10 and the elliptic hole 13b of the third group lens sliding cylinder 13, and hence the rotational operation of the second group lens sliding cylinder 12 and the third group lens sliding cylinder 13 is controlled. However, a control method of the rotational operation of the second group lens sliding cylinder 12 and the third group lens sliding cylinder 13 is not limited to this. The rotational operation of the second group lens sliding cylinder 12 and the third group lens sliding cylinder 13 may be controlled by adopting the configuration (i.e., variation examples 1 to 5) as illustrated in FIGS. 8A to 11.

Figure 8A:
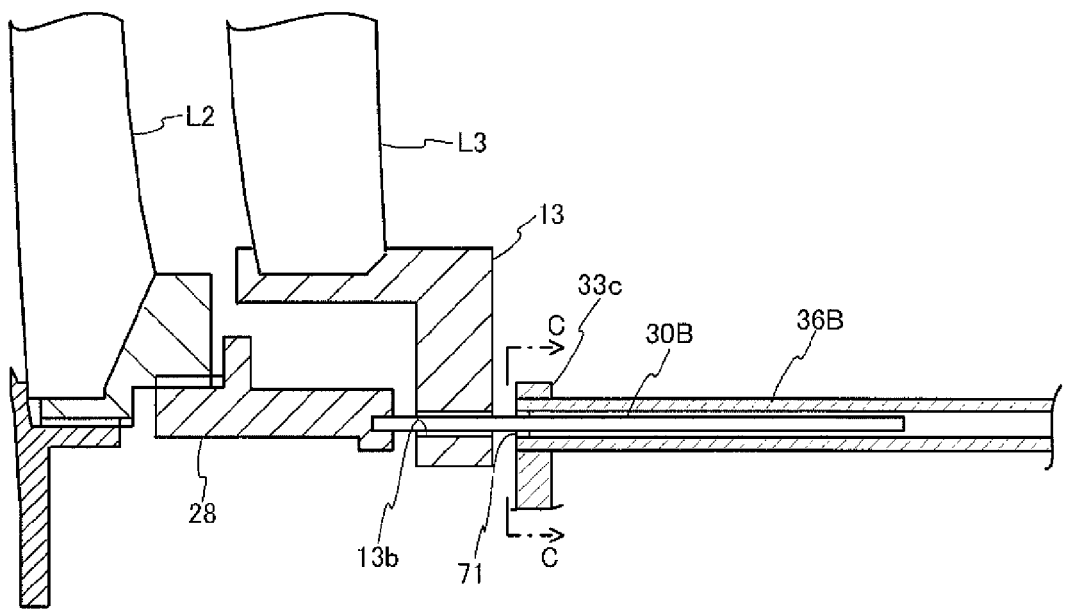
FIG. 8A is a diagram explaining a variation example 1.
Figure 8B:
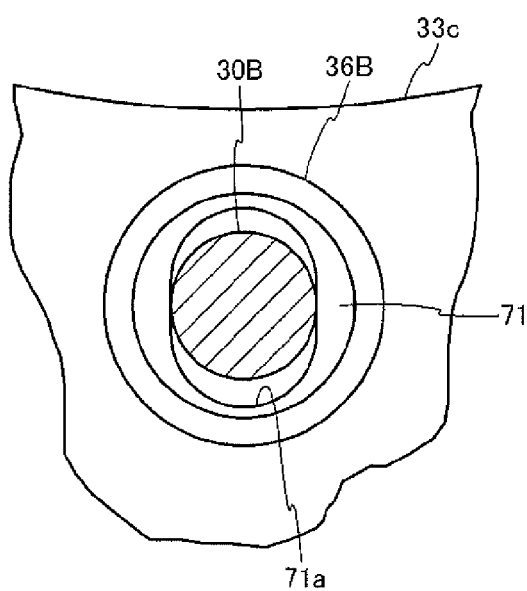
FIG. 8B is a cross-section diagram taken along a line C-C in FIG. 8A.

The configuration according to the variation example 1 is illustrated in FIGS. 8A and 8B. Here, FIG. 8B is a cross-section diagram taken along a line C-C in FIG. 8A. In the variation example 1, a cap-shaped member 71 on which an elliptic hole 71a is formed is provided at a part (i.e., a front end portion) of the guide pipe 36B. Also in this way, since the guide bar 30B keeps contacting with the cap-shaped member 71 (i.e., the elliptic hole 71a) and the third group lens sliding cylinder 13 (i.e., the elliptic hole 13b), it is possible to control the rotational operation of the second group lens sliding cylinder 12 and the third group lens sliding cylinder 13, as with the above-mentioned embodiment.

Figure 9A:
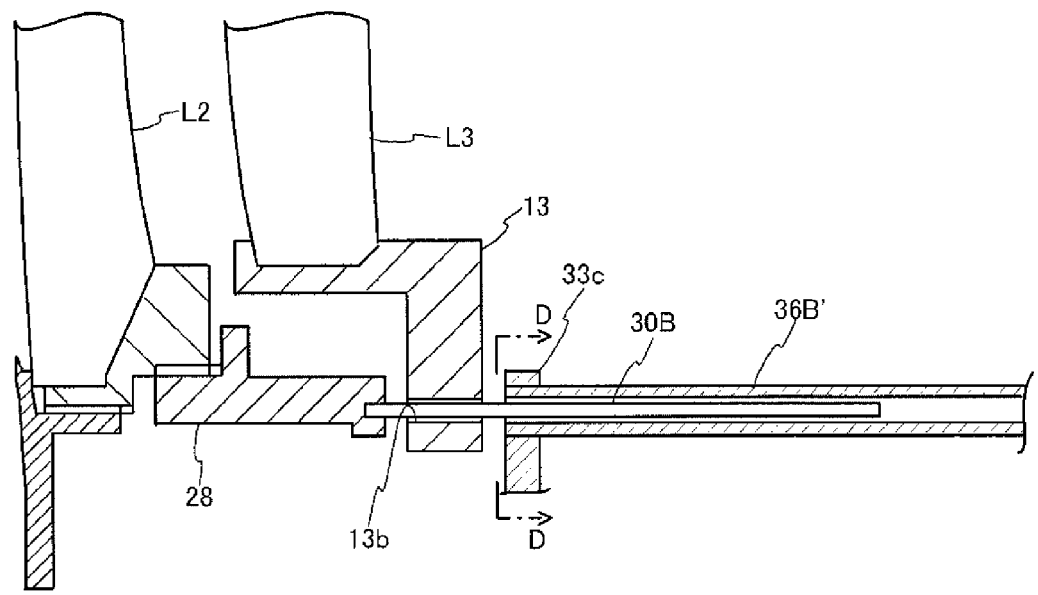
FIG. 9A is a diagram explaining a variation example 2.
Figure 9B:
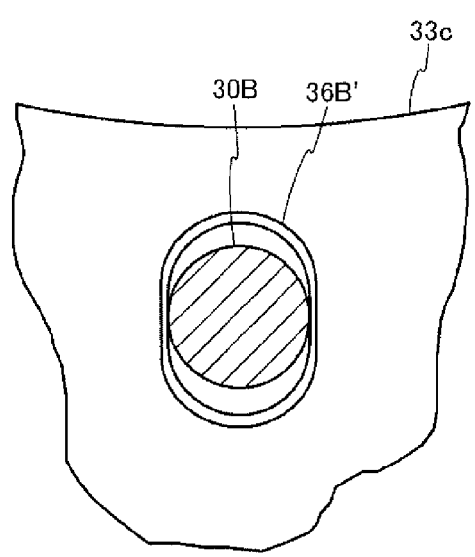
FIG. 9B is a cross-section diagram taken along a line D-D in FIG. 9A.

The configuration according to the variation example 2 is illustrated in FIGS. 9A and 9B. Here, FIG. 9B is a cross-section diagram taken along a line D-D in FIG. 9A. In the variation example 2, a guide pipe 36B" having a flat shape in whole is adopted instead of the guide pipe 36B of the above-mentioned embodiment. Also in this way, since the guide bar 30B keeps contacting with a part of the inner circumferential surface of the guide pipe 36B', it is possible to control the rotational operation of the second group lens sliding cylinder 12 and the third group lens sliding cylinder 13, as with the above-mentioned embodiment. Here, even when the guide pipe 36B' having the flat shape is adopted, a problem does not arise in the moving operation of the fourth and sixth group lens sliding cylinder 14 and the fifth group lens sliding cylinder 15.

Figure 10A:
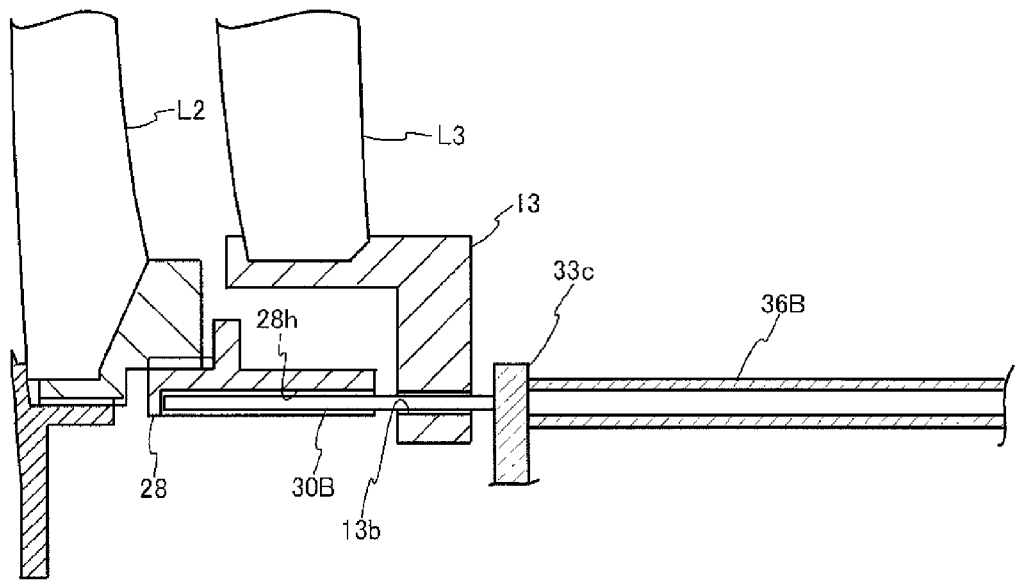
FIG. 10A is a diagram explaining a variation example 3.
Figure 10B:
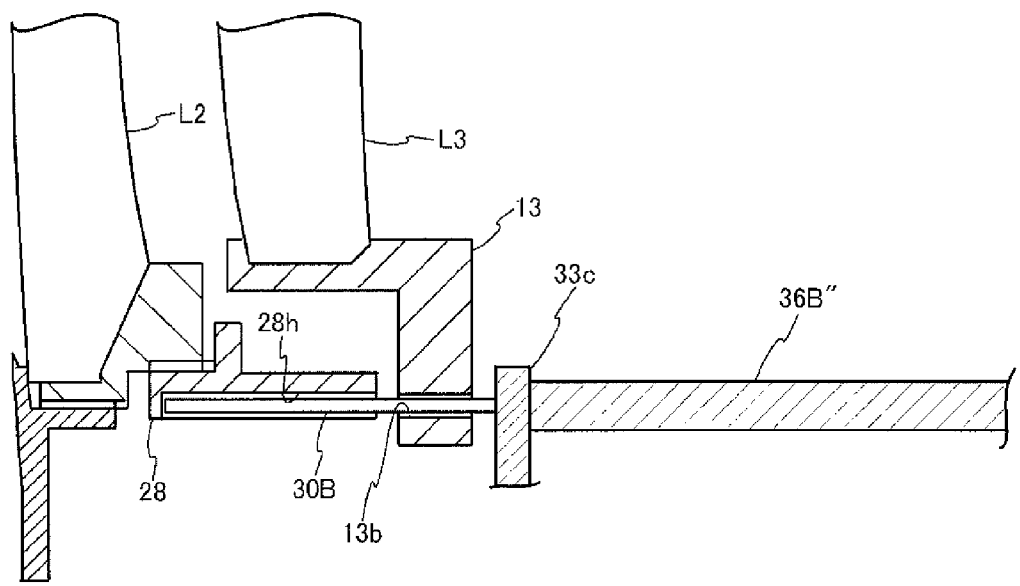
FIG. 10B is a diagram explaining a variation example 4.

The configuration according to the variation example 3 is illustrated in FIG. 10A. In the variation example 3, the guide bar 30B is fixed to the projecting portion 33c of the fixed cylinder 10. Moreover, in the variation example 3, a U-shaped groove 28h is provided in the engaging cylinder 28 of the second group lens sliding cylinder 12. In this case, while the second group lens sliding cylinder 12 is moving in the front-back direction, the guide bar 30B keeps contacting with the U-shaped groove 28h. Even when such a variation example 3 is adopted, it is possible to control the rotational operation of the second group lens sliding cylinder 12 and the third group lens sliding cylinder 13, as with the above-mentioned embodiment. Here, an elliptic hole having the same function as the U-shaped groove may be formed on the engaging cylinder 28 instead of the U-shaped groove 28h. Further, although the guide pipe 36B is adopted in FIG. 10A, the variation example is not limited to this. The guide pipe 36B may be changed to a bar-shaped member (i.e., a guide bar) 36B", as illustrated in the variation example 4 of FIG. 10B.

Figure 11:
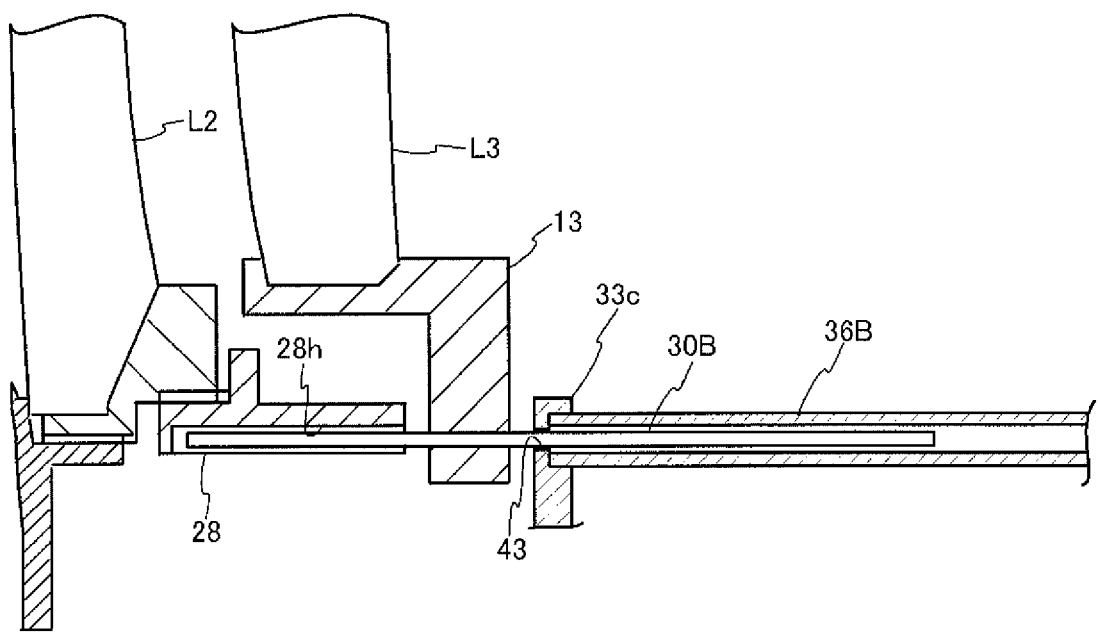
FIG. 11 is a diagram explaining a variation example 5.

The configuration according to the variation example 5 is illustrated in FIG. 11. In the variation example 5, the guide bar 30B is fixed to (or held by) the third group lens sliding cylinder 13. In addition, in the variation example 5, the U-shaped groove 28h is provided in the engaging cylinder 28 of the second group lens sliding cylinder 12. In this case, while the second group lens sliding cylinder 12 and the third group lens sliding cylinder 13 are moving in the front-back direction, the guide bar 30B keeps contacting with the U-shaped groove 28h and the elliptic hole 43. Even when the variation example 5 is adopted, it is possible to control the rotational operation of the second group lens sliding cylinder 12 and the third group lens sliding cylinder 13, as with the above-mentioned embodiment.

Here, the above-mentioned embodiments and the variation examples 1 to 5 can be combined in various ways.

Moreover, although in the above-mentioned embodiment, the description is given of the case where the guide pipes are the double structure, the guide pipes are not limited to this. The guide pipes may be equal to or more than triplicity. In this case, a lens sliding cylinder can be fixed to each guide pipe.

Moreover, although in the above-mentioned embodiment, the description is given of the case where the guide bar 30B and the guide pipe 36B are arranged on the same axis, the arrangement of the guide bar 30B and the guide pipe 36B is not limited to this. The guide bar 30B and the guide pipe 36B may be arranged on different axes, respectively. In this case, the bar-shaped member (i.e., the member as indicated by a code "36" in FIG. 10B) may be used instead of the guide pipe 36B.

Moreover, although in the above-mentioned embodiment, the description is given of the case where all of the first group lens L1 to the sixth group lens L6 move in the direction of the optical axis AX in the case of zooming and only the second group lens L2 moves in the direction of the optical axis AX in the case of focusing (internal focusing), a moving method of the lenses is not limited to this. For example, any of the lenses L1 and L3 to L6 other than the second group lens L2 may move in the direction of the optical axis AX in the case of focusing. Here, a system which performs the focusing by the movement of the first group lens L1 is called a front lens feeding system. Moreover, all of the first group lens L1 to the sixth group lens L6 or a plurality of lenses among these may be moved in the case of focusing. Here, a system which moves all of the lenses is called an all group feeding system.

Moreover, although in the above-mentioned embodiment, the description is given of the case where the guide pipes 36A and 36B and the fixed cylinder 10 are separately constituted and the guide pipes 36A and 36B are supported by the fixed cylinder 10, the constitution of the guide pipes 36A and 36B and the fixed cylinder 10 is not limited to this. For example, the guide pipes 36A and 36B and the fixed cylinder 10 may be integrally formed.

Moreover, although in the above-mentioned embodiment, the description is given of the case where the fourth group lens L4 and the sixth group lens L6 are held by the common lens sliding cylinder 14, a holding form of the lenses is not limited to this. The fourth group lens L4 and the sixth group lens L6 may be held by separate lens sliding cylinders.

The number of lenses and the lens arrangement according to the above-mentioned embodiment are one example. That is, the lens barrel should include at least a lens that is held by a lens sliding cylinder fixed to the guide bar 30A, and a lens that is held by another lens sliding cylinder fixed to the guide bar 30B.

Moreover, although in the above-mentioned embodiment, the description is given of the case where the lens is adopted as an optical member, the optical member is not limited to this. An optical member, such as a mirror and an image capturing element, can be adopted.

The above-mentioned embodiment is a preferable embodiment of the present invention. However, the present invention is not limited to the above-mentioned embodiment, and other embodiments, variations and modifications may be made without departing from the scope of the present invention.

What is claimed is:
1. A lens barrel comprising:
a first cylindrical member that extends in a prescribed axial direction;
a second cylindrical member that slides in the prescribed axial direction along an inner circumferential surface of the first cylindrical member;
an axis member that slides in the prescribed axial direction along an inner circumferential surface of the second cylindrical member;
a first holding member that is fixed to an end of the axis member, is guided in the prescribed axial direction by the slide of the axis member against the second cylindrical member, and holds a first optical member;
a second holding member that is fixed to the second cylindrical member, is guided in the prescribed axial direction by the slide of the second cylindrical member against the first cylindrical member, and holds a second optical member; and
a supporting member that supports at least a part of an outer circumferential surface of the first cylindrical member, wherein:
the second holding member is located between the first holding member and the first cylindrical member in the prescribed axial direction, and a part of the first cylindrical member, which is supported by the supporting member, includes a location in which the second cylindrical member and the axis member extend in an inside of the first cylindrical member.

2. The lens barrel according to claim 1, further comprising:
a control member that extends in the prescribed axial direction, contacts with each of the first holding member and the second holding member, and controls moving operation of the first holding member and the second holding member around a prescribed axis.

3. The lens barrel according to claim 2, further comprising:
a base member to which the first cylindrical member is fixed.

4. The lens barrel according to claim 3, wherein
the control member has a bar shape extending in the prescribed axial direction, and is fixed to any one of the first holding member, the second holding member and the base member.

5. The lens barrel according to claim 4, wherein
the base member has an extending member which extends in the prescribed axial direction,
the lens barrel further comprises a third holding member that is guided in the prescribed axial direction with the use of any one of the first cylindrical member and the extending member, controls moving operation of the third holding member around the prescribed axis by contacting with another one of the first cylindrical member and the extending member, and holds a third optical member.

6. The lens barrel according to claim 5, wherein
the extending member has a cylindrical shape, and
the control member has a bar shape, is fixed to any of the first holding member and the second holding member, and is inserted inside the extending member.

7. The lens barrel according to claim 5, wherein
the control member contacts with a part of an inner circumferential surface of the extending member, so that moving operation of the first holding member and the second holding member around the prescribed axis against the base member is controlled.

8. The lens barrel according to claim 1, wherein
the second holding member is fixed to the first cylindrical member on the same side as a side in which the first holding member is fixed to the axis member.

9. An image capturing device, comprising:
a lens barrel according to claim 1; and
an image capturing unit that captures an image formed by the lens barrel.

10. A method of manufacturing a lens barrel, comprising:
providing a first cylindrical member that extends in a prescribed axial direction;
engaging a second cylindrical member with an inner circumferential surface of the first cylindrical member so that the second cylindrical member is slidable in the prescribed axial direction along the inner circumferential surface of the first cylindrical member;
engaging an axis member with an inner circumferential surface of the second cylindrical member so that the axis member is slidable in the prescribed axial direction along the inner circumferential surface of the second cylindrical member;
providing a first holding member for holding a first optical member;
fixing the first holding member to an end of the axis member so that the first holding member is guided in the prescribed axial direction by the slide of the axis member against the second cylindrical member;
providing a second holding member for holding a second optical member so that the second holding member is located between the first holding member and the first cylindrical member in the prescribed axial direction;
fixing the second holding member to the second cylindrical member so that the second holding member is guided in the prescribed axial direction by the slide of the second cylindrical member against the first cylindrical member; and
providing a supporting member for supporting at least a part of an outer circumferential surface of the first cylindrical member so that a part of the first cylindrical member, which is supported by the supporting member, includes a location in which the second cylindrical member and the axis member extend in an inside of the first cylindrical member.

11. The method of manufacturing the lens barrel according to claim 10, further comprising:
providing a control member that extends in the prescribed axial direction; and
causing the control member to contact with each of the first holding member and the second holding member so that the control member controls moving operation of the first holding member and the second holding member around a prescribed axis.

12. The method of manufacturing the lens barrel according to claim 11, further comprising:
fixing the first cylindrical member to a base member.

13. The method of manufacturing the lens barrel according to claim 12, further comprising:
fixing the control member to any one of the first holding member, the second holding member and the base member, the control member having a bar shape extending in the prescribed axial direction.

14. The method of manufacturing the lens barrel according to claim 13, wherein
the base member has an extending member which extends in the prescribed axial direction,
the method of manufacturing the lens barrel comprising:
providing a third holding member for holding a third optical member so that the third holding member is guided in the prescribed axial direction with the use of any one of the first cylindrical member and the extending member; and
causing the third holding member to contact with another one of the first cylindrical member and the extending member to control moving operation of the third holding member around the prescribed axis.

15. The method of manufacturing the lens barrel according to claim 14, further comprising:
fixing the control member to any of the first holding member and the second holding member;
inserting the control member inside the extending member, the extending member having a cylindrical shape, and the control member having a bar shape.

16. The method of manufacturing the lens barrel according to claim 14, further comprising:
causing the control member to contact with a part of an inner circumferential surface of the extending member, so that moving operation of the first holding member and the second holding member around the prescribed axis against the base member is controlled.

17. The method of manufacturing the lens barrel according to claim 10, further comprising:

fixing the second holding member to the first cylindrical member on the same side as a side in which the first holding member is fixed to the axis member.

18. A method of manufacturing an image capturing device, comprising:
providing the lens barrel manufactured by the method according to claim 9; and
providing an image capturing unit for capturing an image formed by the lens barrel.

\* \* \* \* \*